United States Patent
Malladi et al.

(10) Patent No.: US 8,942,150 B2
(45) Date of Patent: Jan. 27, 2015

(54) UPLINK TIMING CONTROL

(75) Inventors: Durga Prasad Malladi, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 798 days.

(21) Appl. No.: 12/050,702

(22) Filed: Mar. 18, 2008

(65) Prior Publication Data

US 2008/0279131 A1 Nov. 13, 2008

Related U.S. Application Data

(60) Provisional application No. 60/895,685, filed on Mar. 19, 2007.

(51) Int. Cl.
*G08C 17/00* (2006.01)

(52) U.S. Cl.
USPC .......................................................... 370/311

(58) Field of Classification Search
CPC ................... H04W 52/0235; H04W 52/0209; H04W 52/0216; H04W 56/0045; H04W 52/0248; H04W 56/004
USPC .......................................................... 370/311
See application file for complete search history.

(56) References Cited

U.S. PATENT DOCUMENTS

| | | | |
|---|---|---|---|
| 6,212,175 B1 * | 4/2001 | Harsch | 370/338 |
| 6,603,979 B1 * | 8/2003 | Hirsch | 455/502 |
| 6,967,936 B1 | 11/2005 | Laroia et al. | |
| 7,272,078 B1 * | 9/2007 | Haartsen | 368/118 |
| 7,542,437 B1 * | 6/2009 | Redi et al. | 370/311 |
| 7,577,114 B2 * | 8/2009 | Hsieh et al. | 370/311 |
| 2004/0198302 A1 | 10/2004 | Hutchison et al. | |
| 2005/0118981 A1 | 6/2005 | Laroia et al. | |
| 2005/0195772 A1 * | 9/2005 | Nishikawa et al. | 370/337 |

(Continued)

FOREIGN PATENT DOCUMENTS

| | | |
|---|---|---|
| EP | 1594233 A2 | 11/2005 |
| JP | 2007533250 A | 11/2007 |

(Continued)

OTHER PUBLICATIONS

Ericsson: "DRX and DTX in LTE Active," TSG-RAN WG2 Meeting #52, Athens, Greece, Tdoc R2-060967, pp. 1-5, XP-002463498, Mar. 27-31, 2006.

(Continued)

*Primary Examiner* — Sulaiman Nooristany
(74) *Attorney, Agent, or Firm* — Nerrie M. Zohn

(57) ABSTRACT

Systems and methodologies are described that facilitate evaluating and utilizing timing updates in a wireless communications network. A base station can transmit timing adjustment commands to mobile devices as needed as opposed to a periodic timing update where timing adjustment commands are always sent within a certain period. However, the mobile devices need to stay awake to monitor the timing adjustment message resulting in high power consumption. On the other hand with periodic update, the mobile devices can wake up to check whether there is a timing adjustment for itself and, if not, return to a sleep mode. With the proposed method, a mobile device can sleep for a period of time to check for timing adjustment commands upon waking. Thus, both the mobile power consumption and downlink signaling overhead are reduced.

33 Claims, 11 Drawing Sheets

(56) References Cited

U.S. PATENT DOCUMENTS

| | | | |
|---|---|---|---|
| 2005/0221869 A1* | 10/2005 | Liu et al. | 455/574 |
| 2007/0133451 A1* | 6/2007 | Lee et al. | 370/318 |
| 2008/0049708 A1* | 2/2008 | Khan et al. | 370/343 |
| 2008/0304551 A1* | 12/2008 | Li et al. | 375/140 |
| 2009/0092075 A1* | 4/2009 | Corson et al. | 370/328 |

FOREIGN PATENT DOCUMENTS

| | | |
|---|---|---|
| KR | 20060116019 A | 11/2006 |
| RU | 2142672 | 12/1999 |
| RU | 2004134596 A | 5/2005 |
| RU | 2395906 | 7/2010 |
| TW | 200704037 | 1/2007 |
| TW | 200708013 | 2/2007 |
| WO | 9638938 A2 | 12/1996 |
| WO | 03009395 A2 | 1/2003 |
| WO | WO 2005074166 A1 | 8/2005 |
| WO | WO 2005086383 A1 | 9/2005 |
| WO | WO 2005109692 A1 | 11/2005 |
| WO | 2007111941 | 10/2007 |

OTHER PUBLICATIONS

International Search Report—PCT/US2008/057555, International Searching Authority—European Patent Office—Oct. 15, 2008.

Written Opinion—PCT/US2008/057555, International Searching Authority—European Patent Office—Oct. 15, 2008.

Dorot, V., et al., "An Explanatory Dictionary of Modern Computer Terms," 2nd Edition, BHV—Petersburg Publishers, Saint Petersburg, 2001, 'Program Product' on p. 339.

Taiwan Search Report—TW097109780—TIP0—Jul. 19, 2011.

* cited by examiner

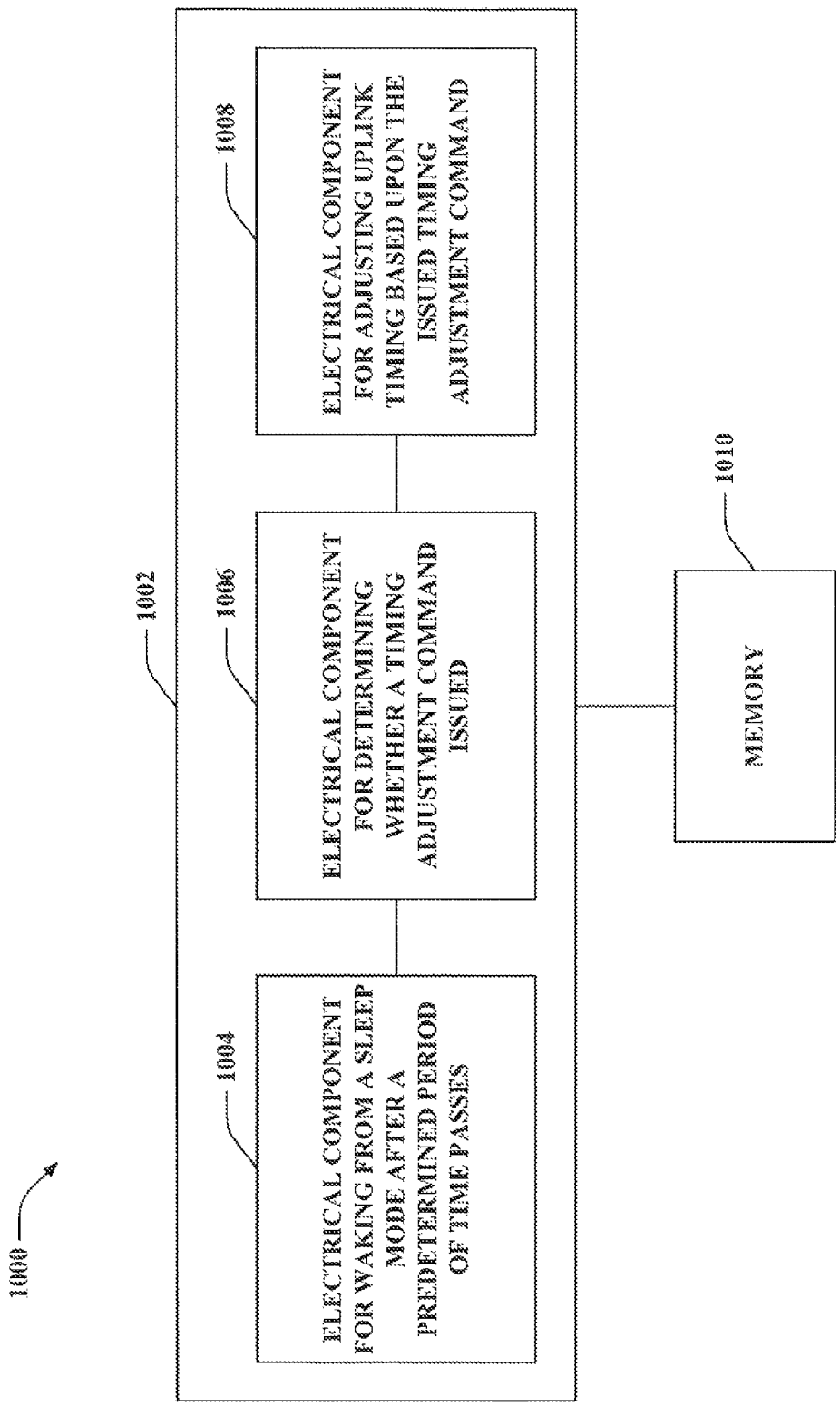

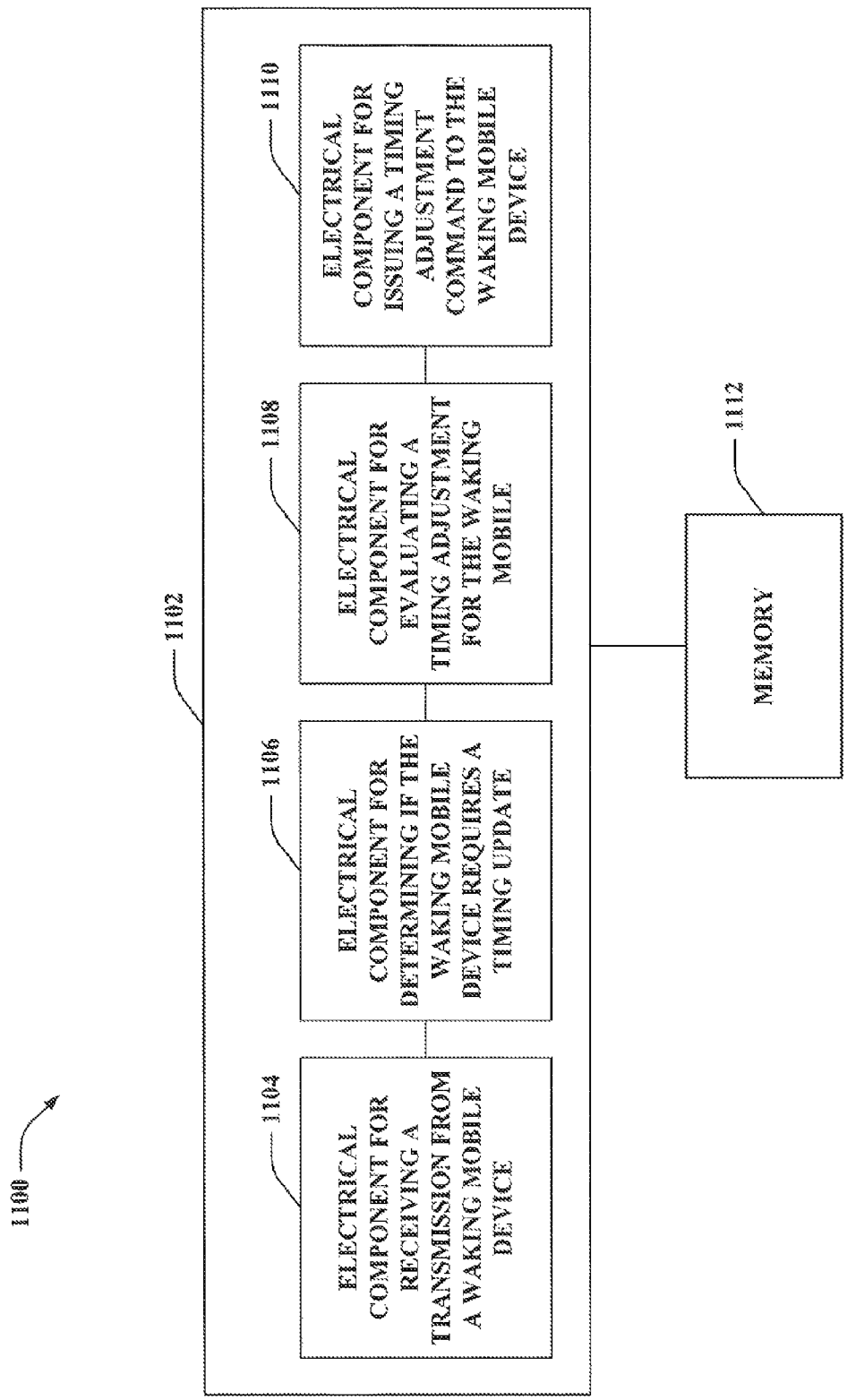

UPLINK TIMING CONTROL

CROSS-REFERENCE TO RELATED APPLICATIONS

This application claims the benefit of U.S. Provisional Patent application Ser. No. 60/895,695 entitled "UL TIMING CONTROL" which was filed Mar. 19, 2007. The entirety of the aforementioned application is herein incorporated by reference.

BACKGROUND

I. Field

The following description relates generally to wireless communications, and more particularly to uplink timing control.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughout and/or greater reliability) if the additional dimensionalities created by the multiple transmit and received antennas are utilized.

MIMO systems may support various depleting techniques to divide forward and reverse link communications over a common physical medium. For instance, frequency division duplex (FDD) systems may utilize disparate frequency regions for forward and reverse link communications. Further, in time division duplex (TDD) systems, forward and reverse link communications may employ a common frequency region. However, conventional techniques may provide limited or no feedback related to channel information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to ail aspect, a method for acquiring a time adjustment is described herein. The method can comprise entering a sleep mode. In addition, the method can include waking from the sleep mode after a predetermined period of time passes. Moreover, the method can comprise determining whether a timing adjustment command issues. The method can also comprise adjusting uplink timing based at least in part on the issued timing adjustment command and reentering the sleep mode.

Another aspect relates to a wireless communications apparatus that can comprise a memory retains instructions related to sleeping until a timer expires, waking after the timer expires, assessing if a timing adjustment command issues and adjusting uplink timing based at least in part on the issued command. The wireless communications apparatus call also include a processor coupled to the memory and configured to execute the instructions retained in the memory.

Yet another aspect relates to a wireless communications apparatus that facilitates conserving power when acquiring a time adjustment. The apparatus can include means for entering a sleep mode. The apparatus can further comprise means for waking from the sleep mode after a predetermined period of time passes. In addition, the wireless communications apparatus can include means for determining whether a timing adjustment command issues. Moreover, the apparatus can comprise means for adjusting uplink timing based at least in part on the issued timing adjustment command and means for reentering the sleep mode.

Still another aspect relates to a machine-readable medium having stored thereon machine-executable instructions for entering a sleep mode and waking from the sleep mode after a predetermined period of time passes. In addition, the machine-readable medium can further comprise instructions for determining whether a timing adjustment command issues. Moreover, the machine-readable medium can include instructions for adjusting uplink timing based at least in part on the issued timing adjustment command and reentering the sleep mode.

According to another aspect an apparatus can comprise an integrated circuit in a wireless communication system. The integrated circuit can be configured to place the apparatus in a sleep mode. The integrated circuit can further be configured to wake the apparatus from the sleep mode after a predetermined period of time passes. In addition, the integrated circuit can be configured to determine whether a timing adjustment command issues. Moreover, the integrated circuit can, be configured to adjust uplink timing based at least in part on the issued timing adjustment command.

According to yet another aspect, a method for updating timing is described herein. The method can comprise receiving a transmission from at least one waking mobile device that provides uplink information. The method can further include determining whether at least one waking mobile device requires a timing update based upon the received transmission. In addition, the method can comprise evaluating a timing adjustment for the at least one waking mobile device. The method can also include issuing a timing adjustment command to the at least one waking mobile device.

Another aspect described herein relates to a wireless communications apparatus that can include a memory. The memory can retain instructions related to receiving a transmission from at least one waking mobile device that provides uplink information, determining whether at least one waking mobile device requires a timing update based upon the received transmission, evaluating a timing adjustment for the at least one waking mobile device; and issuing a timing adjustment command to the at least one waking mobile device. In addition, the wireless communications apparatus can include a processor coupled to the memory and configured to execute the instructions retained in the memory.

Yet another aspect relates to a wireless communications apparatus that facilitates updating timing with reduced overhead. The apparatus can comprise means for receiving a transmission from at least one waking mobile device that provides uplink information. The apparatus can also comprise means for determining whether at least one waking mobile device requires a timing update based upon the received transmission. In addition, the apparatus can include means for evaluating a timing adjustment for the at least one waking mobile device. Moreover, the apparatus can also include means for issuing a timing adjustment command to the at least one waking mobile device.

Still another aspect relates to a machine-readable medium having stored thereon machine-executable instructions for receiving a transmission from at least one waking mobile device that provides uplink information. The machine-readable medium can further include instructions related to determining whether at least one waking mobile device requires a timing update based upon the received transmission. In addition, the machine-readable medium can comprise instructions for evaluating a timing adjustment for the at least one waking mobile device. The machine-readable medium can also include instructions for issuing a timing adjustment command to the at least one waking mobile device.

A further aspect describe herein relates to an apparatus in a wireless communication, system comprising an integrated circuit. The integrated circuit can be configured, to receive a transmission from at least one waking mobile device that provides uplink information. The integrated circuit can be further configured to determine whether at least one waking mobile device requires a timing update based upon the received transmission. In addition, the integrated circuit can be configured to evaluate a timing adjustment for the at least one waking mobile device and to issue a timing adjustment command to the at least one waking mobile device.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 10 is an illustration of an example system that utilizes timing adjustments to control uplink timing.

FIG. 11 is an illustration of an example system that evaluates and transmits timing adjustments.

DETAILED DESCRIPTION

Figure 1:
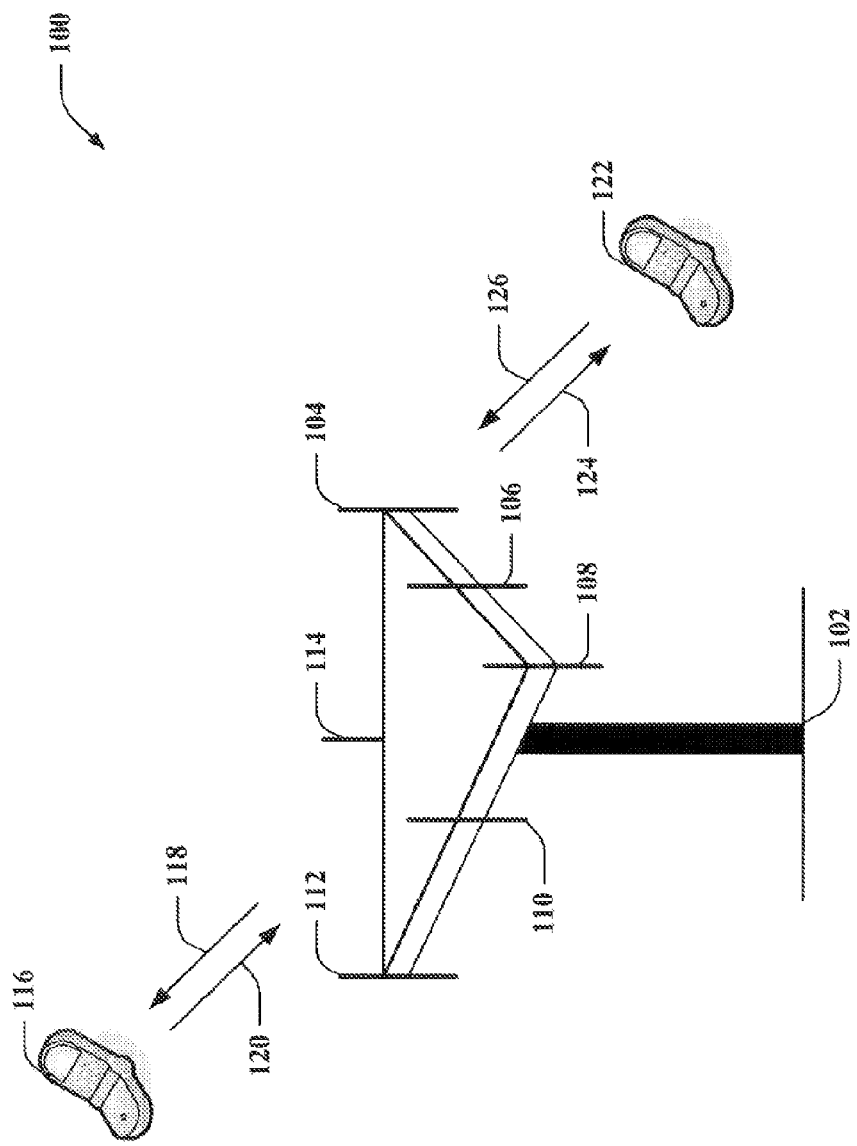
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific, details. In other instances, well-known structures and devices are shown in block diagram form in order to facilitate describing one or snore embodiments.

As used in this application, the terms "component," "module," "system," and the like are intended to refer to a computer-related entity, either hardware, firmware, a combination of hardware and software, software, or software in execution. For example, a component can be, hut is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.) smart cards, and flash memory devices (e.g., EPROM, card, stick, key drive, etc.). Additionally, various storage media described herein can represent one or more devices and/or other machine-readable media for storing information. The term "machine-readable medium" can include, without being limited to wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station, 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time, division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

Figure 2:
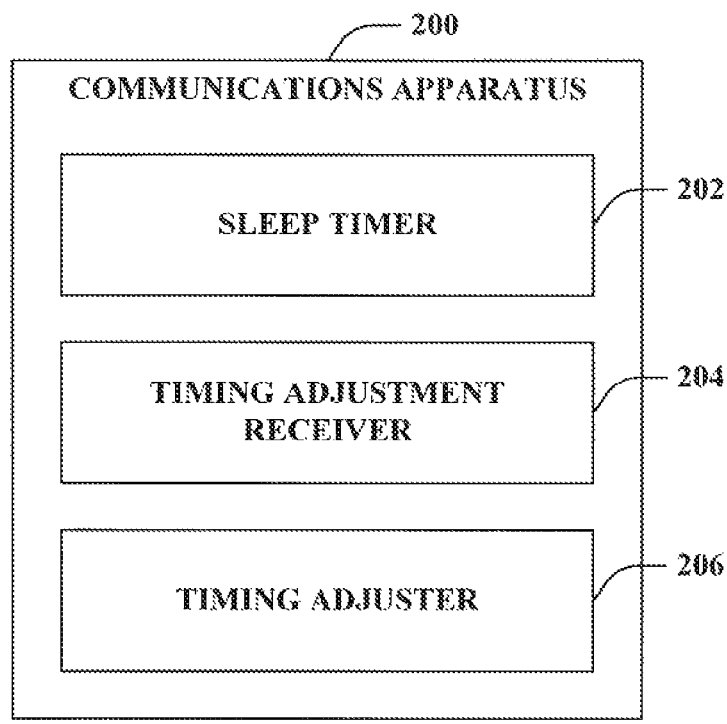
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. In communications systems, communication timing between transmitters and receivers can require adjustment. Thus, the communications apparatus, 200 employ components described below to maintain timing synchronization. The communications apparatus 200 can include a sleep timer 202 that can maintains the communications apparatus 200 in a sleep mode for a predetermined period of time, a timing adjustment receiver 204 that can determine if a timing adjustment command has issued, and a timing adjuster 206 that can execute the timing adjustment command, if it issues, to update communication timing of the communications apparatus 200. The communications device 200 can receive adjustment commands and adjust timing accordingly without continuously monitoring a channel for the commands. Thus, the communications device 200 can conserver power.

According to an example, the communications apparatus 200 can require a timing update. This can occur, for example, as the communications apparatus 200 travels within a communication sector or cell, as another device in communication with the communications apparatus 200 traverse a sector, as propagation conditions change, etc. The communications apparatus 200 can enter a sleep mode that is monitored by the sleep timer 202. The sleep timer 202 holds the communications apparatus 200 in the sleep mode until a predetermined time passes. Pursuant to all illustration, the sleep timer 202 can maintain a timer mechanism that expires after the predetermined time elapses. According to an aspect, the timer mechanism can initiate (e.g., start the clock) when the communications apparatus 200 enters the sleep mode. In one embodiment, the predetermined period of time can be on the order of seconds. Upon expiration of the sleep timer 202, the communications apparatus wakes.

Upon waking, the timing adjustment receiver 204 checks if a timing adjustment command has been issued. For instance, the timing adjustment receiver 204 can read a downlink physical channel to determine if the timing adjustment command has been transmitted. If the timing adjustment receiver 204 ascertains that the timing adjustment command has not issued, the sleep timer 202 can reinitiated and place the communications apparatus 200 back into the sleep mode for another period defined by the predetermined time. If the timing adjustment receiver 204 discovers the timing adjustment command, the command can be forward to the timing adjuster 206. The timing adjuster 206 can adjust timing of a communications link based upon the timing adjustment command. For example, the timing adjuster 206 can update uplink timing of a mobile device. Following adjustment, the communications device 200 can re-enter the sleep mode or proceed with other data transmissions.

Moreover, although not shown, it is to be appreciated that communications apparatus 200 can include memory that retains instructions with respect to maintaining a sleep timer, checking for timing adjustment commands, receiving-timing adjustment commands, making timing adjustments based upon timing adjustment commands, and the like. Further, communications apparatus 200 can include a processor that may be utilized in connection with executing instructions (e.g., instructions retained within memory, instructions obtained from a disparate source.

Figure 3:
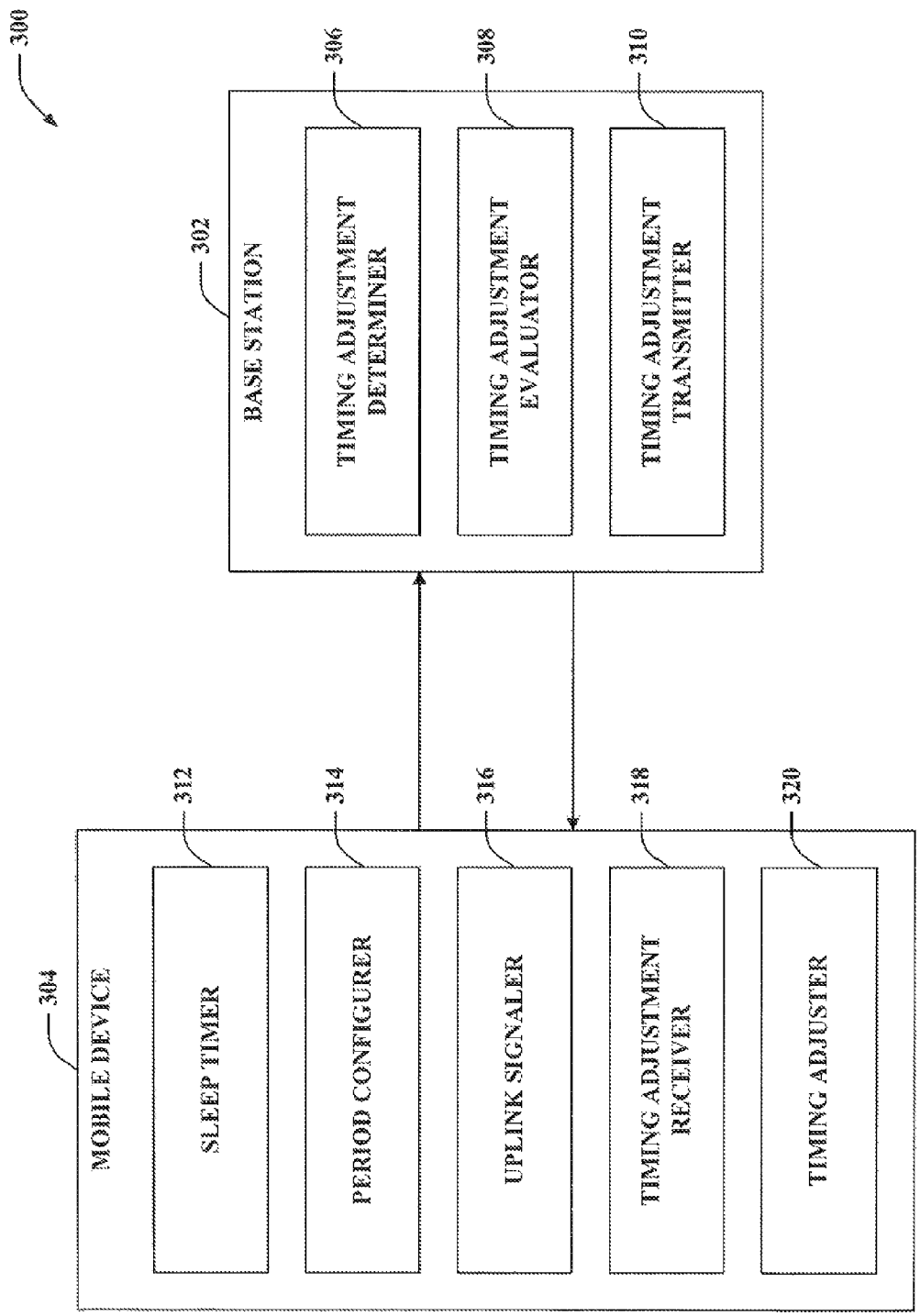
FIG. 3 is an illustration of an example wireless communications system that facilitates uplink timing control.

Now referring to FIG. 3, illustrated is a wireless communications system 300 that can provide timing control between communicative parties while reducing transmission overhead and conserving power. The system 300 includes a base station 302 that communicates with a mobile device 304 (and/or any number of disparate mobile devices (not shown)). Base station 302 can transmit information to mobile device 304 over a forward link channel; further base station 302 can receive information from mobile device 304 over a reverse link channel. Moreover, system 300 can be a MIMO system. Additionally, the system 300 can operate in an OFDMA wireless network a 3GPP LTE wireless network, etc. Also, the components and functionalities shown and described below in the base station 302 can be present in the mobile device 304 as well and vice versa, in one example; the configuration depicted excludes these components for ease of explanation.

Base station 302 includes a timing adjustment determiner 306 that can determine if mobile device 304 requires a timing update, a timing adjustment evaluator 308 that can ascertain a timing update amount needed and a timing adjustment transmitter 310 that can issue a timing adjustment command. Mobile device 304 includes a sleep timer 312 that can maintains the mobile device 304 in a sleep mode for a predetermined period of time, a timing adjustment receiver 318 that can determine if a timing adjustment command has issued, for example, by base station 302 and a timing adjuster 320 that can execute the timing adjustment command, if it issues, to update uplink timing of the mobile device 304. Additionally, the mobile device 304 can include a period configurer 312 that can select a period of time to be employed by the sleep timer 312 and an uplink signaler 316 that can transmit a signal to the base station 302 on an uplink channel.

According to an example, the base station 302 can maintain synchronization with mobile device 304 and other mobile devices (not shown). In evolved UMTS terrestrial radio access (E-UTRA), transmission among mobile devices such as mobile device 304 or transmission between the mobile device 304 and base station 302 require alignment in time. Alignment in time facilitates maintaining orthogonality between mobile devices and reduces interference. Mobile devices, such as mobile device 304, can move about within a cell or sector serviced by the base station 302. Changes in distances between the mobile device 304 and the base station 302 can require an update in uplink timing of mobile device 304 to maintain orthogonality. Pursuant to an illustration, a mobile device moving toward or away from a base station at 350 kilometers per hour can create a change in uplink timing synchronization at a rate of 0.6 microseconds per second. In addition to pure distance changes, propagation conditions can change between a mobile device and base station due to relative movement.

Typically, a base station can employ a per-need mechanism or a periodic mechanism to maintain synchronization. With the per-need mechanism, the base station transmits timing adjustment to mobile devices when the base station determines an adjustment is required. With the periodic mechanism, the base station periodically sends adjustment to all active mobile devices. Active mobile devices include mobile devices actively sending data. It is to be appreciated that active mobile devices can also be mobile devices that are not quite active (e.g., sleeping or otherwise not sending data but retaining access to the system).

The mobile device 304 can enter a sleep mode that is monitored by the sleep timer 312. The sleep timer 312 holds the mobile device in the sleep mode until a predetermined time passes. Pursuant to an illustration, the sleep timer 312 can maintain a timer mechanism that expires after the predetermined time elapses. According to an aspect, the timer mechanism can initiate (e.g., start the clock) when the mobile device enters the sleep mode. The period configurer 314 can select the predetermined time employed to configure the sleep timer 312. According to one aspect, the period configurer 314 can select a period that is shorter than a period utilized by a base station in conventional periodic update mechanisms. The selected period or predetermined time is utilized by the sleep timer 312 to hold the mobile device 304 in the sleep mode for the duration of the selected period.

Upon waking, the uplink signaler 316 can transmit a signal to the base station 302. In one embodiment, the signal can include uplink information. The timing adjustment determiner 306 can determine if the mobile device 304 requires a timing update based upon the signal sent by the uplink signal 316. Pursuant to an illustration, the timing adjustment determiner 306 can measure a difference between local timing of the base station 302 and timing received in the signal. If a sufficient difference is discovered by the timing adjustment determiner 306, the timing adjustment evaluator 308 can ascertain an appropriate update value. According to an aspect, the timing adjustment evaluator 308 can be any value required to synchronize the timing received in the signal to the local timing of the base station 302. The timing adjustment transmitter 310 prepares a timing adjustment command based upon the value evaluated by the timing adjustment evaluator 310. The timing adjustment transmitter 310 can send the timing adjustment command to the mobile device 304. For example, the timing adjustment transmitter 310 can send the command on the FPACH channel.

The timing adjustment receiver 318 checks if the timing adjustment command has been issued. For instance, the timing adjustment receiver 318 can read the downlink physical channel to determine if the timing adjustment command has been transmitted by the base station 302. If the timing adjustment receiver 318 ascertains that the timing adjustment command has not issued, the sleep timer 312 can reinitiated and place the mobile device 304 back into the sleep mode for another period defined by the predetermined time. If the timing adjustment receiver 318 discovers the timing adjustment command, the command can be forward to the timing adjuster 320. The timing adjuster 320 can adjust timing of the uplink based upon the timing adjustment command. According to one aspect, the mobile device 304 can re-enter the sleep mode or proceed with other data transmission following the timing update.

It is to be appreciated that the uplink signaler 316 can transmit an uplink signal with uplink information at any time other than upon waking so long as such signal is sent at least once within the predetermined time period established by the period configurer 314. For example, the uplink signaler 316 can temporarily awaken the mobile device 304 during the middle of the timer to transmit the information. This enables the base station 302 additional time to determine if an update if necessary. In additional, the uplink signaler 316 can transmit the signal prior to entering the sleep mode.

Figure 4:
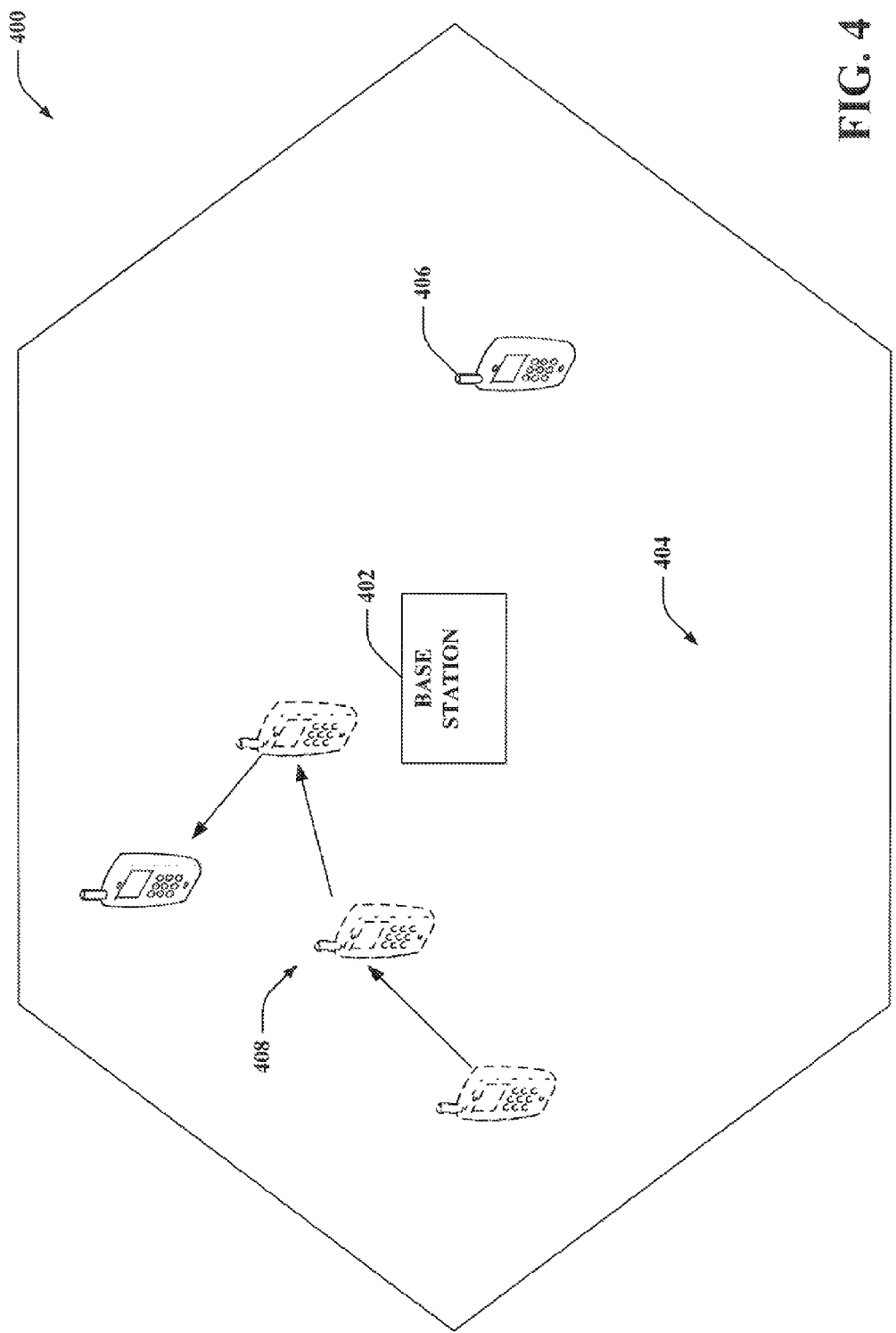
FIG. 4 is at illustration of example sector in accordance with an aspect of the subject disclosure.

Now referring to FIG. 4, an example wireless communications system 400 is illustrated according to one or more aspects of the subject disclosure. The system 400 can comprise an access point or base station 402 that receives, transmits, repeats, etc., wireless communication signals to other base stations (not shown) or to one or more terminals such as terminals 406 and 408. The base station 402 can comprise multiple transmitter chains and receiver chains, e.g., one for each transmit and receive antenna, each of which can in turn comprise a plurality of components associated with signal transmission and reception (e.g., processors, modulators, multiplexers, demultiplexers, antennas, etc.). The mobile devices 406 and 408 can be, for example, cellular phones, smart phones, laptops, handheld communication devices, handheld computing devices, satellite radios, global positioning systems, PDAs, and/or any other suitable device for communicating over wireless system 400. In addition, the mobile devices 406 and 408 can comprise one or more transmitter chains and a receiver chains, such as used for a multiple input multiple output (MIMO) system. Each transmitter and receiver chain can comprise a plurality of components associated with signal transmission and reception (e.g., processors, modulators, multiplexers, demultiplexers, antennas, etc.), as will be appreciated by one skilled in the art.

As illustrated in FIG. 4, the base station 402 provides communication coverage for a particular geographic area 404. The term "cell" can refer to a base station and/or its coverage area, depending on context. To improve system capacity, an access point coverage area can be partitioned into multiple smaller areas. Each smaller area is served by a respective base transceiver subsystem (BTS). The term "sector" can refer to a BTS and/or its coverage area depending upon context. For a sectorized cell, the base transceiver subsystem for all sectors of the cell is typically co-located within the access point for the cell.

According to an example, a mobile device, such as mobile devices 406 and 408, can detect the cell or sector that covers the geographic area 404 served by the base station 402. The mobile device acquires timing and synchronization of the base station 402 via a synchronization channel (SCH). Subsequently, the mobile device can access and demodulate a broadcast channel (BCH) to acquire system information. Pursuant to an illustration, system information can include a set of parameters that define how the mobile devices should access and interact with the system 400. The mobile device can transmit an access probe on a random access channel (RACH). The base station 402 can measure the difference between local reference timing and timing received on the uplink channel of the access problem sent by the mobile device. The base station 402 can transmit an access grant message to the mobile device on a downlink or forward link channel after successfully detecting the access probe. The access grant message can convey uplink resource assignment and/or uplink timing adjustment to the mobile device.

After the initial timing adjustment, mobile devices can requires further updates to maintain synchronization. In E-UTRA, uplink transmission among mobile devices should be aligned to maintain orthogonality between the mobile devices. Pursuant to the illustration in FIG. 4, the mobile device 406 can be a mobile device that is not moving relative to the base station 402, a mobile device moving a small degree in terms of distance and/or a mobile device that is traveling at a low speed relative to the base station 402. In addition, the mobile device 408 can be a moving mobile device that is frequently moving relative to the base station 402 and/or a mobile device that is traveling at a high speed. The base station 402 can employ at least one of a per-need update mechanism or a periodic update mechanism to update timing of the mobile devices 406 and 408. The per-need update mechanisms reduces overhead by only sending timing adjustments to mobile devices when the base station 402 determines the mobile devices require timing updates. However, the mobile devices 406 and 408 typically need to be awake and monitoring the forward link channels for timing adjustments substantially all the time in order to receive messages containing timing updates. Thus, the mobile device 406 and 408 consume greater power with per-need update mechanisms.

The periodic update mechanisms can reduce power consumption on the part of mobile devices 406 and 408 at the cost of increased overhead. The base station 402 can transmit timing updates to all mobile devices once every period. However, to be effective, the period is defined by high speed mobile device such as mobile device 408. The mobile device 408 requires more frequent timing updates than mobile device 406. However, the base station 402 transmits updates to the mobile device 406 at the came frequency as updates to the mobile device 408. Accordingly, overhead is increased. In accordance with one aspect, the base station 402 can transmit timing adjustments on a modified per-need basis to reduce overhead. Moreover, the mobile device 406 and 409 can enter a sleep mode to conserve power and periodically awaken to check for timing adjustments.

The techniques described herein may be used for a system 400 with sectorized cells as well as a system with un-sectorized cells. For clarity, the following description is for a system with sectorized cells. The terms "access point" and "base station" is used generically for a fixed station that serves a sector as well as a fixed station that serves a cell. The terms "terminal," "user" and "user equipment" are used interchangeably, and the terms "sector," "access point" and "base station" are also used interchangeably. A serving access point/sector is an access point/sector with which a terminal communicates. A neighbor access point/sector is an access point/sector with which a terminal is not in communication.

Figure 5:
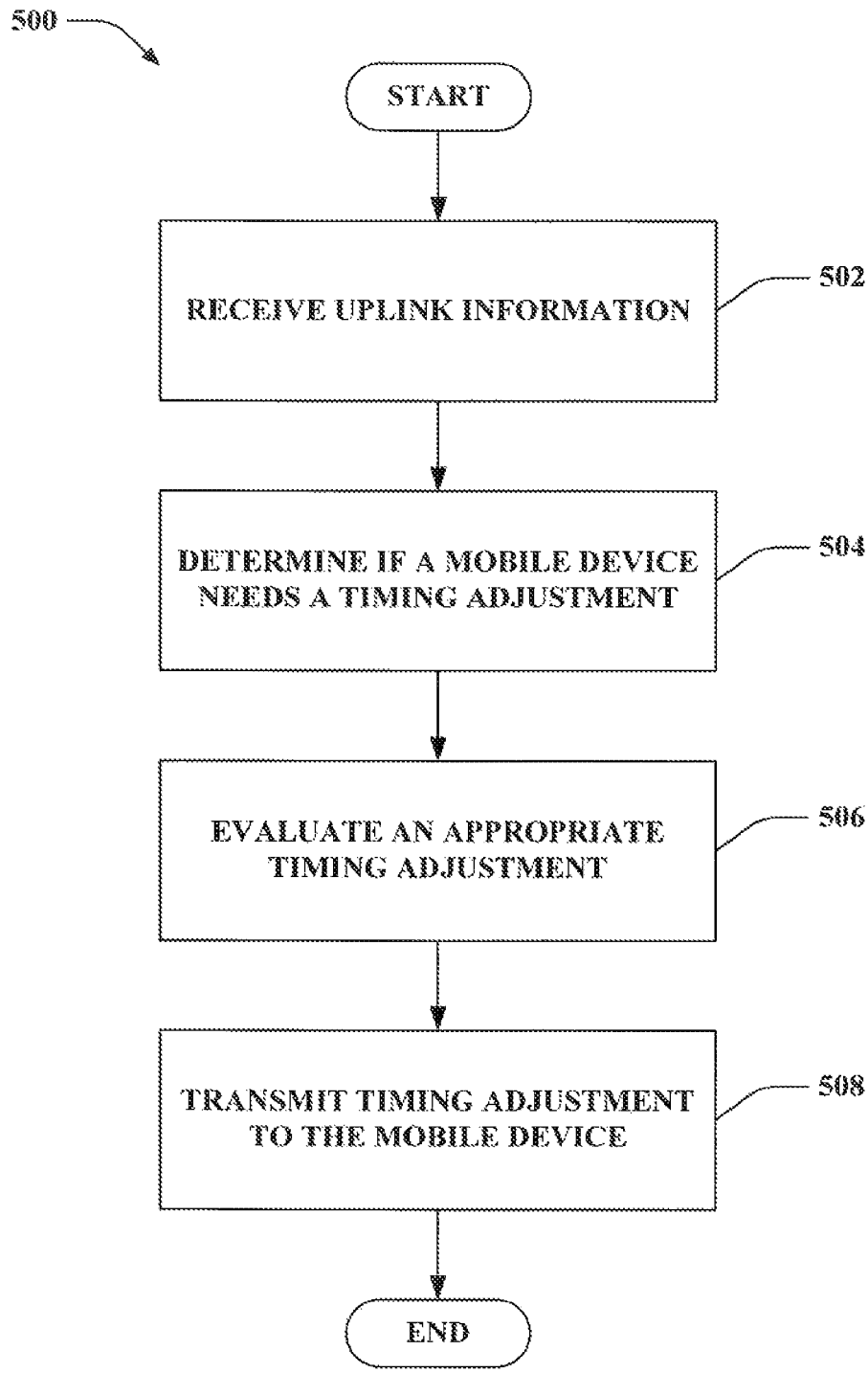
FIG. 5 is an illustration of an example methodology that facilitates providing timing updates in a wireless communications network.
Figure 6:
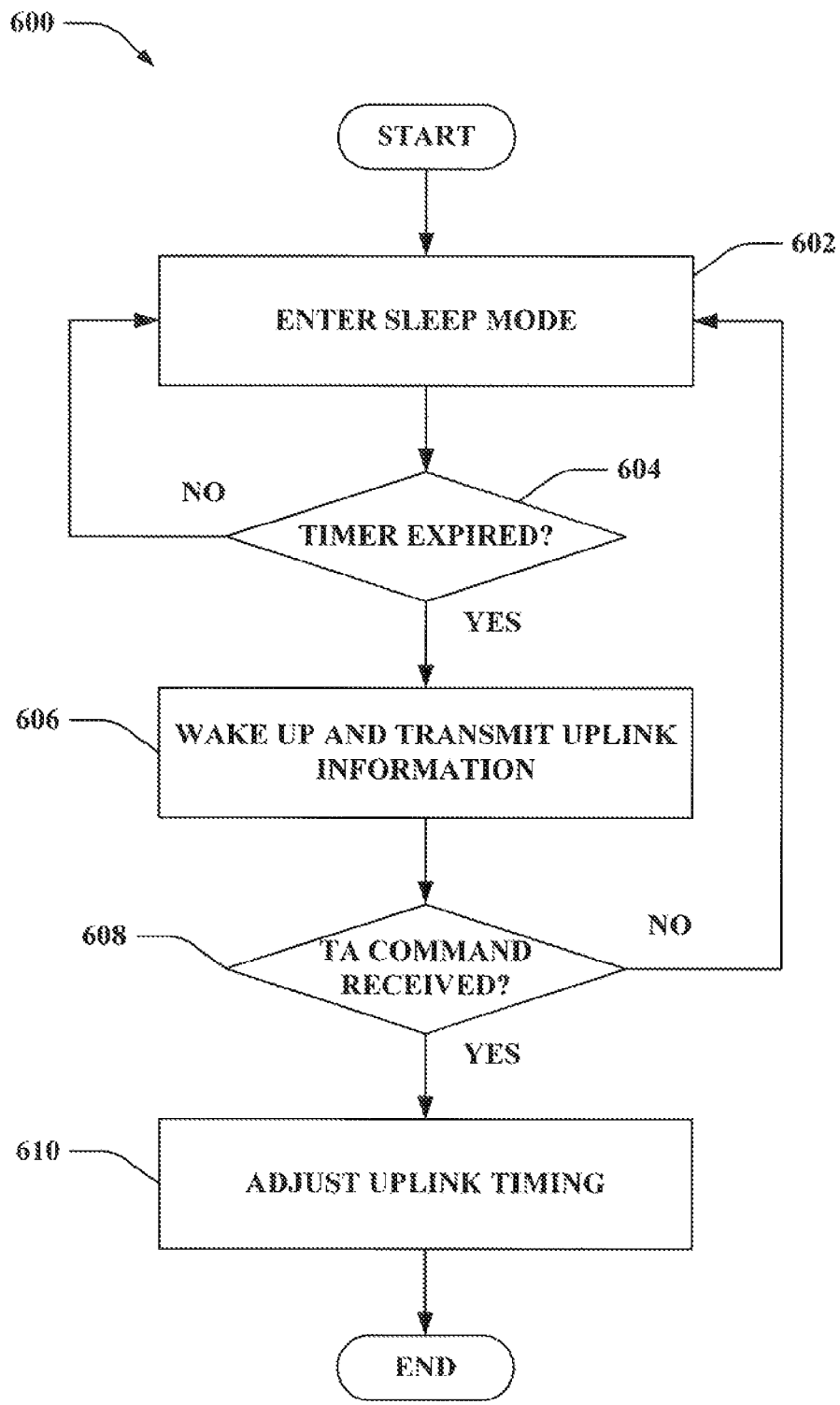
FIG. 6 is an illustration of an example methodology that facilitates conserving power while acquiring timing updates.

Referring to FIGS. 5-6, methodologies relating to providing uplink timing control while reducing overhead and power consumption are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates providing timing updates in a wireless communications network. In accordance with an aspect, the methodology 500 can be performed by a base station in a wireless communication environment. At reference numeral 502, uplink information is received. For example, uplink information can be received via a transmission from a mobile device awaking from a sleep mode. In addition, the transmission can be sent while the mobile device is in the sleep mode and/or prior to entering the sleep mode. At reference numeral 504, it is determined whether the mobile device sending the uplink information requires a timing adjustment. Pursuant to an illustration, local reference timing can be compared to the timing of the received signal carrying the uplink information. At reference numeral 506, an appropriate timing adjustment is evaluated. For example, the timing adjustment value can be the difference between the local timing and the timing of the received uplink information. At reference numeral 508, the timing adjustment is transmitted to the mobile device. Pursuant to an illustrative embodiment, the timing adjustment can be encapsulated in a timing adjustment command transmitted on a forward link channel.

Now referring to FIG. 6, a methodology 600 that facilitates conserving power while acquiring timing updates. In accordance with an aspect, the methodology 600 can be performed by a mobile device in a wireless communication environment. At reference numeral 602, a sleep mode is entered. For instance, a mobile device can enter a sleep mode to conserve power and maintain only a minimal amount of signaling required to retain access to a communication system. At reference numeral 604, a determination is made as to whether a sleep timer has expired. Pursuant to an illustration, the sleep mode is maintained for a predetermined amount of time. If the predetermined amount of time has not expired, the mobile device continues to sleep at reference numeral 602. If, at reference numeral 604, it is determined that the timer has expired, the methodology 600 proceeds to reference numeral 606 where the mobile device wakes up. In accordance with an embodiment, the mobile device transmits uplink information at reference numeral 606. At reference numeral 608, it is checked whether or not a timing adjustment command is received. If no, the methodology 600 returns to reference numeral 602 where the sleep mode is re-entered. If a timing adjustment command is received at reference numeral 608, the methodology 600 proceeds to reference numeral 610 where uplink timing is adjust in accordance with the timing adjustment command.

It will be appreciated that, in accordance with one or more aspects described herein, inferences can be made regarding determining a sleep period, ascertaining a timing adjustment need, evaluating a timing adjustment values, etc. in a wireless communications network as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods or systems presented above can include making inferences pertaining to determining a sleep period. For example, a hopping pattern can be selected based on inferences made regarding past sleep periods and/or past timing adjustments, such as the situations in which a mobile device traveled rapidly in a sector and required more frequent adjustments. Additionally, inferences can be made with respect to determining a need for a timing update and/or evaluating a timing adjustment.

Figure 7:
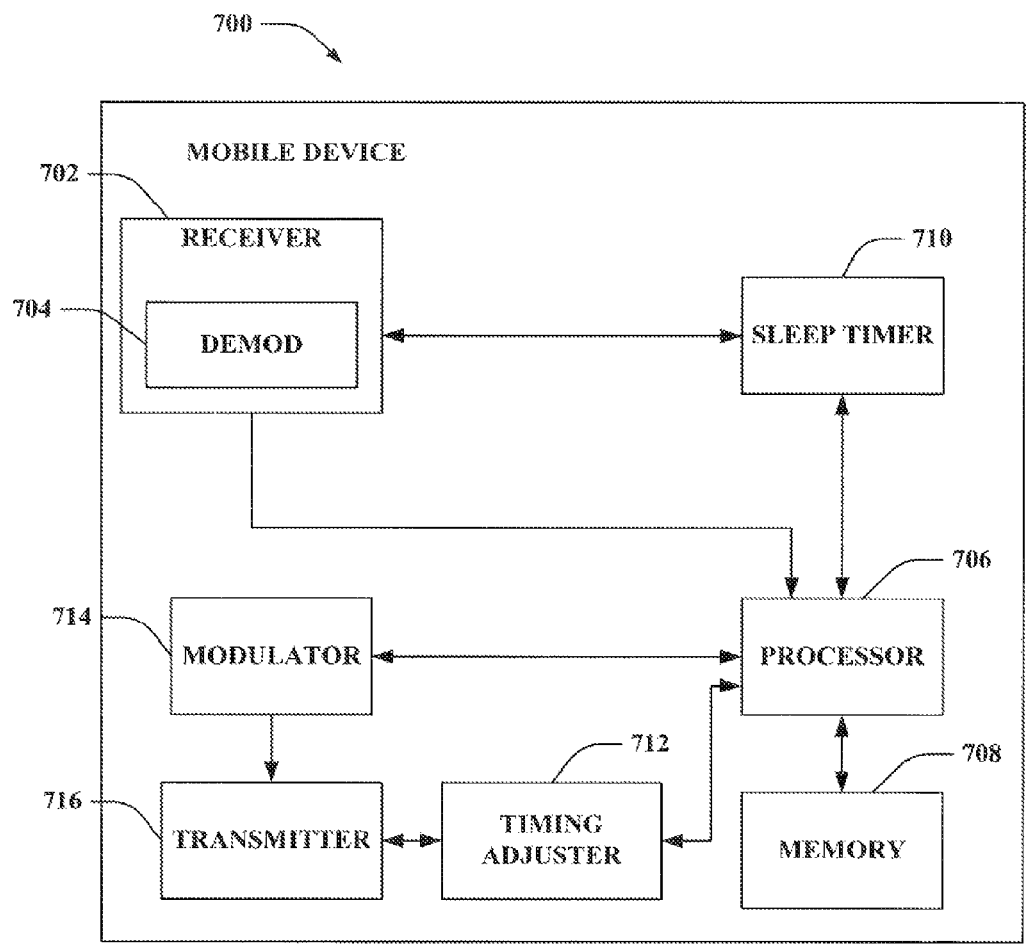
FIG. 7 is an illustration of an example mobile device that facilitates acquiring and utilizing timing adjustments.

FIG. 7 is an illustration of a mobile device 700 that facilitates acquiring and utilizing timing adjustments. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 7018 can additionally store protocols and/or algorithms associated with estimating and/or utilizing a channel (e.g., performance based, capacity based, etc.).

It will be appreciated that the data store (e.g., memory 709) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can further be operatively coupled to a sleep timer 710 that holds the mobile device 700 in the sleep mode until a predetermined time passes as described supra, for instance. Pursuant to an illustration, the sleep timer 710 can maintain a timer mechanism that expires after the predetermined time elapses. According to an aspect, the timer mechanism can initiate (e.g., start the clock) when the mobile device enters the sleep mode. Upon expiration of the sleep timer 710, the mobile device 700 can awaken and determine if a timing adjustment command has issued from, for example, a base station. According to an example, the receiver 702 can read a fast physical access channel to receive a timing adjustment command if issued.

Mobile device 700 still further comprises a modulator 714 and transmitter 716 that respectively modulate and transmit signals to, for instance, a base station, another mobile device, etc. Pursuant to illustration, the transmitter 716 can transmit uplink information while the mobile device 700 is in a sleep mode, before the mobile device 700 enters sleep mode and/or immediately upon waking. The processor 706 can also be operatively coupled to a timing adjuster 712 that can increase, reduce, and/or configure uplink timing utilized by the transmitter 716 to transmit the uplink signals. According to an example, the mobile device 700 can receive a timing adjustment command from a base station and the timing adjuster 712 can adjust uplink timing based at least in part on the received timing adjustment command. Although depicted as being separate from the processor 706, it is to be appreciated that the sleep timer 710, timing adjuster 712, demodulator 704, and/or modulator 714 call be part of the processor 706 or multiple processors (not shown).

Figure 8:
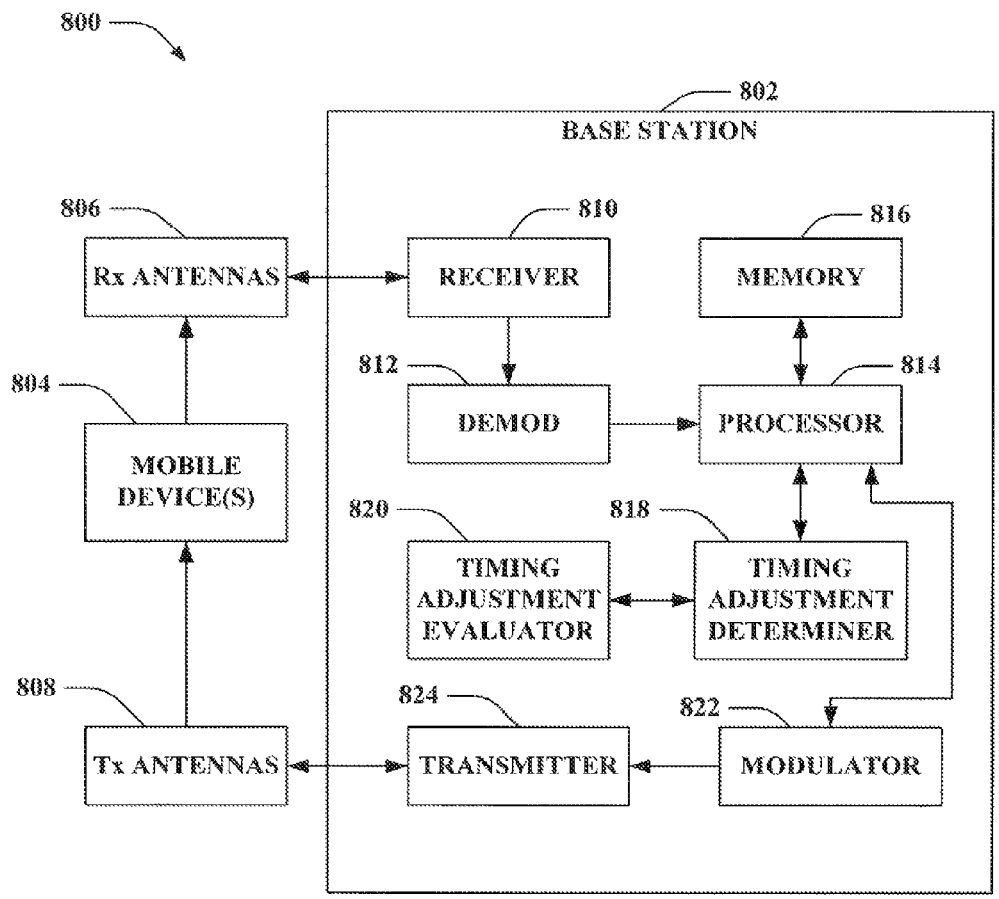
FIG. 8 is an illustration of an example system that facilitates evaluating, transmitting and receiving timing updates for uplink channels.

FIG. 8 is an illustration of a system 800 that facilitates evaluating, transmitting and receiving timing updates for uplink channels as described supra. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 912 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a timing adjustment determiner 818 that can ascertain if mobile devices 804 require timing updates. Moreover, the processor 814 can be coupled to a timing adjustment evaluator 820 that can generate timing adjustment commands that update timing of mobile device 804 according to the identified need.

According to an example, the base station 802 can receive communication from one or more mobile devices 804 and can determine a timing update need for the device 804 based on the communication. For example the timing adjustment determiner 818 can compare local reference timing of the base station 802 with timing included in the received communication. Subsequently, if uplink timing of the device 804 requires updating as described supra, the timing adjustment evaluator 820 can generate an appropriate timing adjustment command. The timing adjustment command can be transmitted to a respective mobile device 804. Subsequently, the mobile device 804 can utilize the timing adjustment command to update uplink timing. Furthermore, although depicted as being separate from the processor 914, it is to be appreciated that the timing adjustment determiner 818, timing adjustment evaluator 820, demodulator 812, and/or modulator 822 can be part of the processor 814 or multiple processors (not shown).

Figure 9:
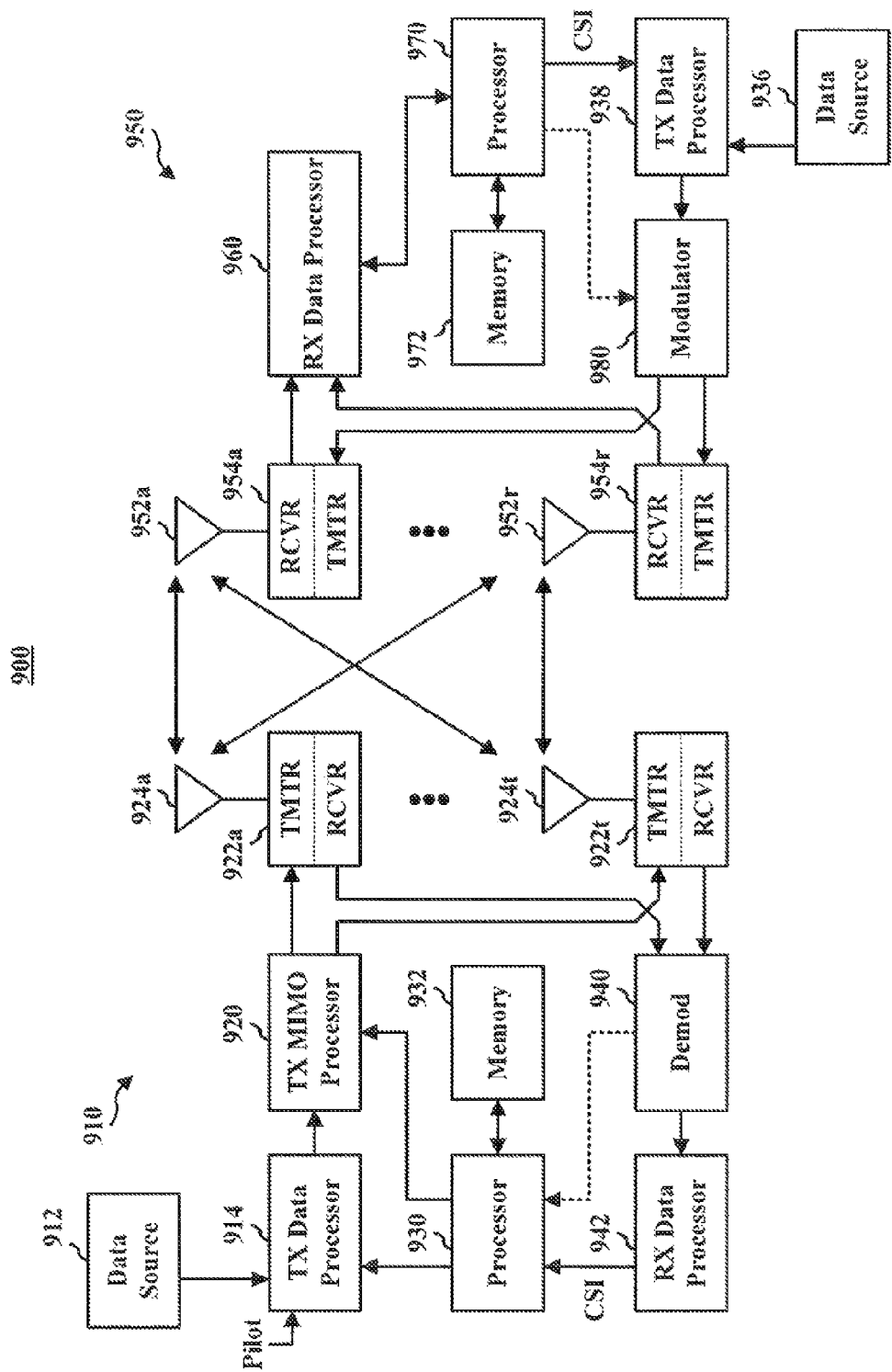
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), techniques/configurations (FIG. 4) and/or methods (FIGS. 5-6) described herein to facilitate-wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924l, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which preceding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

With reference to FIG. 10, illustrated is a system 1000 that utilizes timing adjustments to control uplink timing. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. The logical grouping 1002 can include an electrical component for waking from a sleep mode after a predetermined period of time passes 1004. In addition, the logical grouping 1002 can comprise an electrical component for determining whether a timing adjustment command issued 1006. Moreover, the logical grouping 1002 can include an electrical component for adjusting uplink timing based upon the issued timing adjustment command 1008. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Turning to FIG. 11, illustrated is a system 1100 that evaluates and transmits timing adjustments in a wireless communications network. System 1100 can reside within a base station, mobile device, etc., for instance. As depicted, system 1100 includes functional blocks that can represent functions implemented by a processor, software, or combination thereof (e.g., firmware). System 1100 includes a logical grouping 1102 of electrical components that facilitate evaluating timing adjustments. Logical grouping 1102 can include an electrical component for receiving a transmission from a waking mobile device 1104. Moreover, logical grouping 1102 can include an electrical component for determining if the waking mobile device requires a timing update 1106. Further, logical grouping 1102 can comprise an electrical component for evaluating a timing adjustment for the waking mobile 1108. In addition, logical grouping 1102 can include an electrical component for issuing a timing adjustment command to the waking mobile 1110. Additionally, system 1100 can include a memory 1112 that retains instructions for executing functions associated with electrical components 1104, 1106, 1108 and 1110. While shown as being external to memory 1112, it is to be understood that electrical components 1104, 1106, 1108 and 1110 can exist within memory 1112.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the tem "comprising" as "comprising" is interpreted when employed as a transitional word in a, claim.

What is claimed is:

1. A method for acquiring a time adjustment at a user equipment (UE), comprising:
    entering a sleep mode;
    waking from the sleep mode after a predetermined period of time passes;
    signaling uplink information at the UE, the uplink information providing an uplink timing of the UE;
    determining whether a timing adjustment command has issued, wherein the issuance of the timing adjustment command is based on properties of the UE;
    adjusting the uplink timing at the UE based on the issued timing adjustment command when a timing adjustment command is determined to have issued; and
    reentering the sleep mode without the adjusting when no timing adjustment command is determined to have issued;
    wherein the properties of the UE comprise at least one of a velocity of the UE and a current synchronization timing of the UE.

2. The method of claim 1, further comprising selecting the predetermined period of time.

3. The method of claim 1, further comprising signaling the uplink information upon waking from the sleep mode.

4. The method of claim 1, further comprising signaling the uplink information prior to entering the sleep mode.

5. The method of claim 1, further comprising signaling the uplink information while in the sleep mode.

6. The method of claim 1, wherein the determining of whether the timing adjustment command issued comprises receiving a downlink physical channel.

7. A wireless communications apparatus, comprising: a memory that retains instructions for:
   entering a sleep mode;
   waking from the sleep mode after a predetermined period of time passes;
   signaling uplink information, the uplink information providing an uplink timing of the wireless communications apparatus;
   determining whether a timing adjustment command has issued, wherein the issuance of the timing adjustment command is based on properties of the wireless communications apparatus;
   adjusting the uplink timing based on the issued timing adjustment command when a timing adjustment command is determined to have issued; and reentering the sleep mode without the adjusting when no timing adjustment command is determined to have issued;
   wherein the properties of the wireless communications apparatus comprise at least one of a velocity of the wireless communications apparatus and a current synchronization timing of the wireless communications apparatus; and a processor coupled to the memory configured to execute the instructions retained in the memory.

8. The wireless communications apparatus of claim 7, wherein the memory further retains instructions for selecting the predetermined period of time.

9. The wireless communications apparatus of claim 7, wherein the instructions for determining whether the timing adjustment command issued comprises instructions for receiving a downlink physical channel.

10. A wireless communications apparatus that facilitates conserving power when acquiring a time adjustment, comprising:
   means for entering a sleep mode; means for waking from the sleep mode after a predetermined period of time passes;
   means for signaling uplink information, the uplink information providing an uplink timing of the wireless communications apparatus;
   means for determining whether a timing adjustment command has issued, wherein the issuance of the timing adjustment command is based on properties of the wireless communications apparatus;
   means for adjusting the uplink timing based on the issued timing adjustment command when a timing adjustment command is determined to have issued; and
   means for reentering the sleep mode without the adjusting when no timing adjustment command is determined to have issued;
   wherein the properties of the wireless communications apparatus comprise at least one of a velocity of the wireless communications apparatus and a current synchronization timing of the wireless communications apparatus.

11. The wireless communications apparatus of claim 10, further comprising means for selecting the predetermined period of time.

12. The wireless communications apparatus of claim 10, wherein the signaling of the uplink information occurs upon waking from the sleep mode.

13. The wireless communications apparatus of claim 10, wherein the signaling of the uplink information occurs prior to entering the sleep mode.

14. The wireless communications apparatus of claim 10, wherein the signaling of the uplink information occurs while in the sleep mode.

15. The wireless communications apparatus of claim 10, wherein the means for determining whether a timing adjustment command has issued comprises means for receiving a downlink physical channel.

16. A computer program product stored on a non-transitory computer-readable medium, comprising code for:
   entering a sleep mode; waking from the sleep mode after a predetermined period of time passes;
   signaling uplink information, the uplink information providing an uplink timing of a user equipment (UE);
   determining whether a timing adjustment command has issued, wherein the issuance of the timing adjustment command is based on properties of the wireless communications apparatus;
   adjusting the uplink timing based on the issued timing adjustment command when a timing adjustment command is determined to have issued; and
   reentering the sleep mode without the adjusting when no timing adjustment command is determined to have issued;
   wherein the properties of the wireless communications apparatus comprise at least one of a velocity of the wireless communications apparatus and a current synchronization timing of the wireless communications apparatus.

17. The computer program product of claim 16, further comprising code for selecting the predetermined period of time.

18. The computer program product of claim 16, wherein the signaling of the uplink information occurs upon waking from the sleep mode.

19. The computer program product of claim 16, wherein the signaling of the uplink information occurs prior to entering the sleep mode.

20. The computer program product of claim 16, wherein the signaling of the uplink information occurs while in the sleep mode.

21. In a wireless communication system, an apparatus comprising an integrated circuit configured to:
   place the apparatus in a sleep mode; wake the apparatus from the sleep mode after a predetermined period of time passes;
   signal uplink information at the apparatus, the uplink information providing an uplink timing of the apparatus;
   determine whether a timing adjustment command has issued, wherein the issuance of the timing adjustment command is based on properties of the wireless communication system;
   adjust the uplink timing at the apparatus based on the issued timing adjustment command when a timing adjustment command is determined to have issued; and
   reenter the sleep mode without the adjusting when no timing adjustment command is determined to have issued;
   wherein the properties of the UE comprise at least one of a velocity of the UE and a current synchronization timing of the UE.

22. A method for updating timing, comprising:
   receiving, at a base station, a transmission from a waking user equipment (UE), the transmission including uplink information, the uplink information including an uplink timing of the UE;
   determining, at the base station, that the waking UE requires a timing update based upon the uplink information;

calculating a timing adjustment, at the base station, for the waking UE when it is determined that waking UE requires a timing update; and issuing a timing adjustment command, from the base station, to the waking UE, on a per need basis, when it is determined that the waking UE requires a timing update, wherein the issuance of the timing adjustment command is based on properties of the UE;

wherein the properties of the UE comprise at least one of a velocity of the UE and a current synchronization timing of the UE.

23. The method of claim 22, further comprising comparing local reference timing with the uplink timing of the waking UE to determine a timing difference.

24. The method of claim 23, wherein calculating the timing adjustment comprises generating a timing adjustment command based on the timing difference.

25. A wireless communications apparatus, comprising:
a memory that retains instructions for:
receiving a transmission from a waking user equipment (UE), the transmission including uplink information, the uplink information including an uplink timing of the UE;
determining that the waking UE requires a timing update based upon the uplink information; calculating a timing adjustment for the waking UE when it is determined that the waking UE requires a timing update; and
issuing a timing adjustment command to the waking UE, on a per need basis, when it is determined that the waking UE requires a timing update, wherein the issuance of the timing adjustment command is based on properties of the UE;
wherein the properties of the UE comprise at least one of a velocity of the UE and a current synchronization timing of the UE; and a processor coupled to the memory configured to execute the instructions retained in the memory.

26. The wireless communications apparatus of claim 25, wherein the memory further retains instructions for comparing local reference timing with the uplink timing of the waking UE to determine a timing difference.

27. The wireless communications apparatus of claim 26, wherein the instructions for calculating the timing adjustment comprises instructions for generating a timing adjustment command based on the timing difference.

28. A wireless communications apparatus that facilitates updating timing with reduced overhead, comprising:
means for receiving a transmission from a waking user equipment (UE), the transmission including uplink information, the uplink information including an uplink timing of the UE;
means for determining that the waking UE requires a timing update based upon the uplink information;
means for calculating a timing adjustment for the waking UE when it is determined that the waking UE requires a timing update; and
means for issuing a timing adjustment command to the waking UE, on a per-need basis, when it is determined that the waking UE requires a timing update, wherein the issuance of the timing adjustment command is based on properties of the UE;
wherein the properties of the UE comprise at least one of a velocity of the UE and a current synchronization timing of the UE.

29. The wireless communications apparatus of claim 28, further comprising means for comparing local reference timing with the uplink timing of the waking UE to determine a timing difference.

30. The method of claim 29, wherein the means for calculating the timing adjustment comprises means for generating a timing adjustment command based on the timing difference.

31. A computer program product stored on a non-transitory computer-readable medium, comprising code for:
receiving a transmission from a waking user equipment (UE), the transmission including uplink information, the uplink information including an uplink timing of the UE;
determining that the waking UE requires a timing update based upon the uplink information;
calculating a timing adjustment for the waking UE when it is determined that the waking UE requires a timing update; and
issuing a timing adjustment command to the waking UE, on a per need basis, when it is determined that the waking UE requires a timing update, wherein the issuance of the timing adjustment command is based on properties of the UE;
wherein the properties of the UE comprise at least one of a velocity of the UE and a current synchronization timing of the UE.

32. The computer program product of claim 31, further comprising code for comparing local reference timing with the uplink timing of the waking UE to determine a timing difference.

33. In a wireless communication system, an apparatus comprising an integrated circuit configured to:
receive a transmission from a waking user equipment (UE), the transmission including uplink information, the uplink information including an uplink timing of the UE;
determine that the waking UE requires a timing update based upon the uplink information;
calculate the timing adjustment for the waking UE when it is determined the waking UE requires a timing update; and
issue a timing adjustment command to the waking UE, on a per-need basis, when it is determined that waking UE requires a timing update, wherein the issuance of the timing adjustment command is based on properties of the UE;
wherein the properties of the UE comprise at least one of a velocity of the UE and a current synchronization timing of the UE.

* * * * *